(12) United States Patent
Liu et al.

(10) Patent No.: US 7,739,417 B2
(45) Date of Patent: Jun. 15, 2010

(54) METHOD, APPARATUS AND SYSTEM FOR SEAMLESSLY SHARING A GRAPHICS CARD AMONGST VIRTUAL MACHINES

(75) Inventors: Yongfeng Liu, Beijing (CN); Chunmei Liu, Beijing (CN); Jun Chen, Beijing (CN); Ke Ke, Beijing (CN)

(73) Assignees: Legend Holdings Ltd., Beijing (CN); Lenovo (Beijing) Limited, Beijing (CN)

( * ) Notice: Subject to any disclaimer, the term of this patent is extended or adjusted under 35 U.S.C. 154(b) by 171 days.

(21) Appl. No.: 12/025,287

(22) Filed: Feb. 4, 2008

(65) Prior Publication Data

US 2008/0215770 A1 Sep. 4, 2008

(30) Foreign Application Priority Data

Feb. 8, 2007 (CN) .................. 2007 1 0063753

(51) Int. Cl.
*G06F 3/00* (2006.01)
*G06F 21/00* (2006.01)
(52) U.S. Cl. ................. 710/3; 710/30; 710/56; 718/104; 345/543; 345/545; 345/565; 711/6
(58) Field of Classification Search ............ 710/30, 710/3; 345/530, 568, 599
See application file for complete search history.

(56) References Cited

U.S. PATENT DOCUMENTS

| 7,065,630 | B1 * | 6/2006 | Ledebohm et al. | 711/206 |
| 2006/0236094 | A1 * | 10/2006 | Leung et al. | 713/152 |
| 2008/0005297 | A1 * | 1/2008 | Kjos et al. | 709/223 |
| 2008/0077917 | A1 | 3/2008 | Chen et al. | |
| 2009/0172667 | A1 | 7/2009 | Wang et al. | |

OTHER PUBLICATIONS

Toby Opferman, "Sharing Memory with the Virtual Machine," Nov. 1, 2005, http://www.ddj.com/cpp/184402033.*
Samuel T. King et al., "Operating System Support for Virtual Machines," Proceedings of the 2003 USENIX Technical Conference, 14 pages.*
Michael Sweeney, "Run multiple operating systems on a single PC with Virtual PC," TechRepublic, Jun. 9, 2003, http://articles.techrepublic.com.com/5100-10878_11-5035049.html.*

* cited by examiner

*Primary Examiner*—Tariq Hafiz
*Assistant Examiner*—Dayton Lewis-Taylor
(74) *Attorney, Agent, or Firm*—Patterson Thuente Christensen Pedersen, P.A.

(57) ABSTRACT

The present invention provides a virtual machine system and a method of accessing a graphics card. The virtual machine system includes a VMM, an SOS and at least one GOS, and further includes a resource converting module for performing IO address converting on graphics card framebuffer accessing data from GOS(s) or mapping MMIO(s) to physical MMIO(s) of a graphics card based on a resource converting table, and sending the processed data to the graphics card; and a framebuffer allocating module for dividing a framebuffer resource of the graphics card into multiple blocks and allocating them respectively to corresponding GOS(s). The resource converting table(s) records correspondences between a resource allocation for the graphics card by SOS and a resource allocation for the graphics card by GOS(s). The framebuffer MMIO resource(s) allocated to the graphics card by GOS(s) is/are the framebuffer allocated to GOS(s) by the framebuffer allocating module.

9 Claims, 3 Drawing Sheets

METHOD, APPARATUS AND SYSTEM FOR SEAMLESSLY SHARING A GRAPHICS CARD AMONGST VIRTUAL MACHINES

RELATED APPLICATIONS

The present application claims priority to Chinese Application No. 200710063753.7 filed Feb. 8, 2007, which is incorporated herein in its entirety by reference.

FIELD OF THE INVENTION

The present invention relates to the field of computer virtualization technologies, more particularly, to a virtual machine system and a method of accessing a graphics card by the same.

BACKGROUND OF THE INVENTION

Virtualization technologies have wide applications in the computer field with the development of computer systems. Modern computers are capable of supporting a plurality of virtual machines by means of virtualization technologies and running a separate operating system respectively on each virtual machine.

In a virtual machine system, the respective operating systems need to access the hardware. Among others, the access to a graphics card is relatively complex. The different ways in which the graphics card is used are important factors which influence users' experiences. At present, primary virtualization technologies, such as VMW, Virtual PC and the like, adopt substantially the same solutions, that is, providing a virtualized graphics card for a Guest Operating System (GOS). The virtualized graphics card is a general graphics card, which can only achieve basic display functions and is rather different from a real graphics card.

FIG. 1 is a schematic view showing a prior art virtual machine system. The virtual machine system comprises a Virtual Machine Monitor (VMM) 140, a Service Operating System (SOS) 110, and at least one GOS 120. Upon starting, the SOS 110 scans a PCI bus to find a real graphics card 130 and acquire information on the real graphics card 130, so as to allocate resources, such as interrupt requests (IRCs), input/outputs (IOs), and memory-mapped IOs (MMIOs), for the real graphics card 130. The SOS 110 accesses the graphics card 130 by a real graphics card drive 112.

The SOS 110 comprises a Device Module (DM) 111 which provides a virtual graphics card for each GOS 120. Upon starting, the GOS(s) 120 scans a virtual PCI bus to find the virtual graphics card(s) and acquire information on the virtual graphics card(s), so as to allocate resources (IRQs, IOs, and MMIOs) for the virtual graphics card(s). When the GOS(s) 120 is accessing the virtual graphics card(s) through a virtual graphics card drive 126, the accessing data are sent, through the VMM 140, to the DM 111, which in turn converts the accessing data and send it to the real graphics card drive 112. The real graphics card drive 112 processes the received data, and then send it to the graphics card 130.

The virtual machine system comprises at least one GOS 120. When there are several GOSs, the respective GOS operating systems use the graphics card 130 through the SOS 110. Therefore, only the SOS 110 may see the real graphics card 130 and access the graphics card 130 by means of the real graphics card drive 112, while each GOS 120 sees the virtual graphics card provided by the DM 111 and accesses the graphics card by means of the virtual graphics card drive 126. Thus, the hardware accelerating properties of the graphics card 130 may not be used by the users and even the function of 3D animation is not supported. As a result, the displaying performance is deteriorated, and the users' experiences on the graphics card are compromised.

SUMMARY OF THE INVENTION

It is an object of the present invention to provide a virtual machine system and a method of accessing a graphics card by the same, wherein a plurality of virtual operating systems share one real physical graphics card, with each GOS having performances and properties approaching the real graphics card.

To achieve the above object, the present invention provides a virtual machine system, comprising a Virtual Machine Monitor (VMM), a Service Operating System (SOS), and at least one Guest Operating System (GOS), wherein the VMM comprises a communication module and the SOS comprises a Device Module (DM), and the virtual machine system further comprises:

a resource converting module for performing 10 address conversions on graphics card framebuffer accessing data from the GOS(s) or mapping MMIO(s) to physical MMIO(s) of a graphics card based on a resource converting table or resource converting tables, and sending the processed data to the graphics card; and a framebuffer allocating module for dividing a framebuffer resource of the graphics card into a plurality of blocks and allocating them respectively to the corresponding GOS(s), wherein, the resource converting table(s) records correspondences between a resource allocation for the graphics card by the SOS and a resource allocation or resource allocations for the graphics card by the GOS(s), the framebuffer MMIO resource(s) allocated to the graphics card by the GOS(s) is/are the framebuffer allocated to the GOS(s) by the framebuffer allocating module.

In the above virtual machine system, the resource converting module is further configured to convert IRQ(s) received from the graphics card into interrupt number(s) for the GOS(s) and then send the number(s) to the corresponding GOS(s).

In the above virtual machine system, the resource converting table(s) comprises the correspondences between IOs, the correspondences between IRQs and the correspondences between MMIOs after the SOS and the GOS(s) allocate the resources for the graphics card respectively.

In the above virtual machine system, the VMM runs at a high end of a memory, while the GOS(s) runs at a low end of the memory.

The above virtual machine system may further comprise:

a register access control module for setting a value of a display start address register of the graphics card to a start address of the framebuffer corresponding to the GOS currently in the foreground, and sending accesses to graphics card control registers by the operating system currently in the foreground to the graphics card control registers, while sending accesses to the graphics card control registers by the other operating system(s) to a register simulating and saving module; and the register simulating and saving module for simulating changes in the graphics card control registers based on the accesses to the graphics card control registers by the GOS(s) and a process flow of the graphics card control registers, and saving the values of the graphics card control registers.

In the above virtual machine system, the register access control module is also configured to, when a switching takes place, restore simulation values of the graphics card control registers corresponding to a first GOS switched to the foreground to the graphics card control registers, sending the accesses to the graphics card control registers by the first GOS to the graphics card control registers, and also amending the value of the display start address register of the graphics card to the start address of the framebuffer allocated to the first GOS.

The present invention also provides a method of accessing a graphics card by a virtual machine system, comprising:

a step of allocating a framebuffer, in which a framebuffer resource of the graphics card is divided into a plurality of blocks, and then allocated to corresponding GOS(s); and a step of processing accesses to the framebuffer of the graphics card, in which a VMM performs IO address converting on graphics card framebuffer accessing data from the GOS(s) or maps MMIO(s) to physical MMIO(s) of the graphics card based on a resource converting table or resource converting tables, and then send it to the graphics card, wherein, the resource converting table(s) records correspondences between a resource allocation for the graphics card by a SOS and a resource allocation or resource allocations for the graphics card by the GOS(s), the framebuffer MMIO resource(s) allocated to the graphics card by the GOS(s) is/are the framebuffer allocated to the GOS(s) by the framebuffer allocating module.

The above method may further comprise:

a step of processing accesses to graphics card control registers, in which the VMM sends the accesses to the graphics card control registers by the GOS in the foreground to the graphics card control registers, while simulates and saves the accesses to the graphics card control registers by the other GOS(s) based on a process flow of the real graphics card control registers.

The above method may further comprise:

a step of switching display, in which a value of a display start address register of the graphics card is set to a start address of the framebuffer corresponding to the GOS currently in the foreground, and when a switching takes place, the simulation values of the graphics card control registers corresponding to a first GOS switched to the foreground are restored to the graphics card control registers, the accesses to the graphics card control registers by the first GOS are sent to the graphics card control registers, and also the value of the display start address register of the graphics card are amended to the start address of the framebuffer allocated to the first GOS.

The above method further comprises a step of converting IRQ(s) received from the graphics card into interrupt number(s) for the GOS(s) and the n send the number(s) to the corresponding GOS(s).

In the above method, the resource converting table(s) comprises the correspondences between IOs, the correspondences between IRQs and the correspondences between MMIOs after the SOS and the GOS(s) allocate the resources for the graphics card, respectively.

The virtual machine system and the method according to the present invention have a number of advantages, including the following.

When a plurality of GOSs commonly access the graphics card, it is possible to access the real graphics card through the resource converting table(s) and to solve the problem of display confusion when a plurality of GOSs commonly access the graphics card, by recording the correspondences between the resource allocation for the graphics card by the SOS and the resource allocation(s) for the graphics card by the GOS(s) in the resource converting table(s), and dividing the framebuffer of the graphics card into a plurality of blocks and allocating them to the GOS(s).

Also, in the present invention, the accesses to the graphics card control registers by the GOS in the foreground are sent to the graphics card control registers, while the accesses to the graphics card control registers by the other GOS(s) are intercepted and simulated, so that a situation wherein a plurality of GOSs have different display modes may be supported. And when a switching takes place, the value of the display start address of the graphics card is amended to the start address of the framebuffer allocated to the GOS in the foreground, effectively solving the problem of display switching.

DETAILED DESCRIPTION

The present invention is described in detail hereinafter with reference to the drawings.

The present invention aims to provide a virtual machine system and a method of accessing a graphics card by the same, wherein a plurality of virtual operating systems share one real physical graphics card, with each GOS having performances and properties approaching the real graphics card. Therefore, first of all, each OS in the virtual machine system shall be able to access the real graphics card.

Therefore, the present invention first provides a virtual machine system and a method of accessing a graphics card by the same, wherein each OS is able to access the real graphics card.

Figure 1:
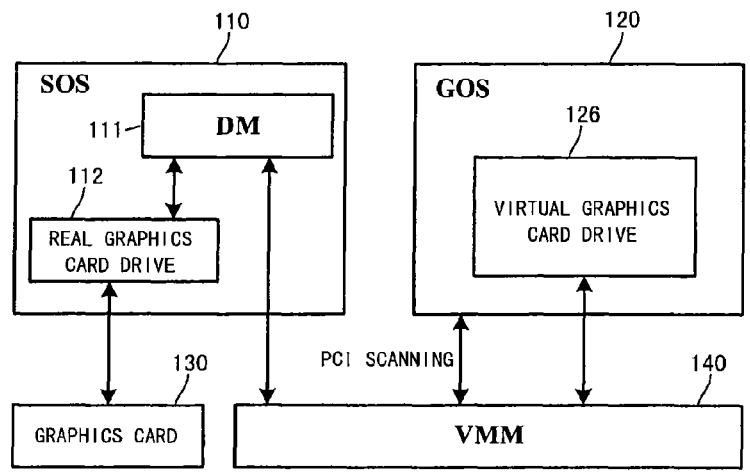
FIG. 1 is a schematic view showing a configuration of a prior art virtual machine system.
Figure 2:
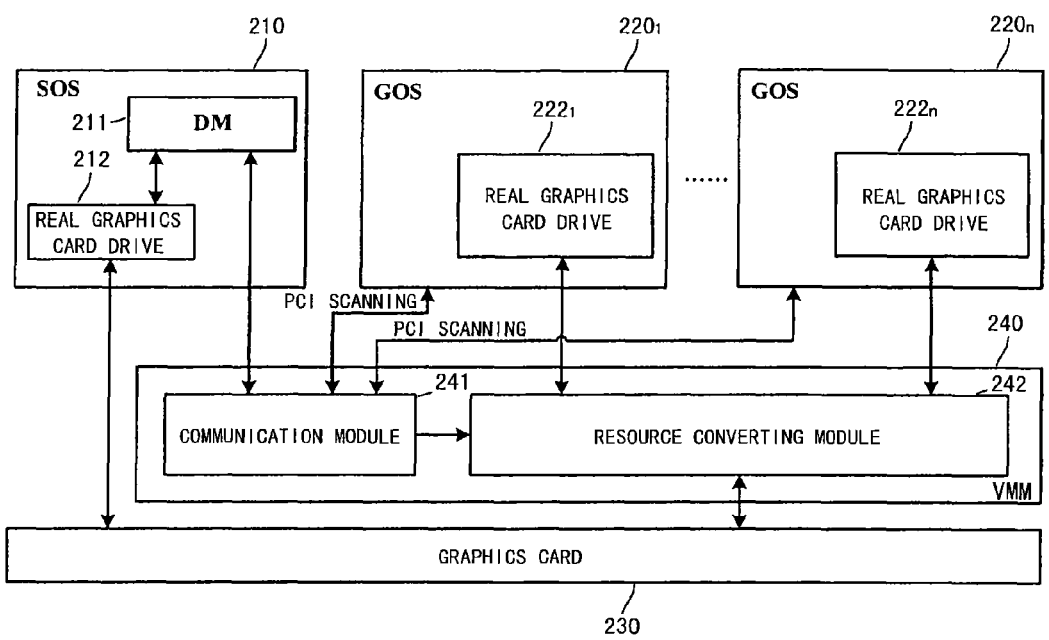
FIG. 2 is a schematic structure view showing a configuration of a virtual machine system wherein a GOS may see a real graphics card and access the graphics card through a real graphics card drive.

As shown in FIG. 2, showing a schematic view illustrating a configuration of a virtual machine system wherein each GOS $220_1 \ldots 220_n$ can see the real graphics card 230 and thus access the graphics card 230 through a real graphics card drive $222_1 \ldots 222_n$, the virtual machine system comprises a Virtual Machine Monitor (VMM) 240, a Service Operating System (SOS) 210 at least one Guest Operating System (GOS) $220_1 \ldots 220_n$ and a graphics card 230.

The VMM 240 is provided with a communication module 241 for performing communications between the VMM 240 and the SOS 210 and the respective GOS(s) $220_1 \ldots 220_n$.

The SOS 210 is provided with a DM 211 for acquiring information on the graphics card 230.

The GOS(s) $220_1 \ldots 220_n$ accesses the DM 211 through the communication module 241, acquires the information on the graphics card 230, allocates resources for the graphics card 230, and sends the resource allocating information to the DM 211 through the communication module 241. The GOS(s) $220_1 \ldots 220_n$ also comprises a real graphics card drive $222_1 \ldots 222_n$ for sending graphics card framebuffer accessing data of the GOS(s) $220_1 \ldots 220_n$ to the VMM 240.

The DM 211 of the SOS 210 is also used for acquiring the resource allocating information for the graphics card 230 by the SOS 210 and the resource allocating information for the graphics card 230 by the GOS(s) 220$_1$ ... 220$_n$, and generating a resource converting table/tables based on these pieces of information and then sending the table(s) to the VMM 240.

The VMM 240 also comprises a resource converting module 242 for saving the resource converting table(s), and performing IO address converting on the graphics card framebuffer accessing data from the GOS(s) or mapping MMIO(s) to physical MMIO(s) of the graphics card 230 based on the resource converting table(s), and then sending the processed data to the graphics card 230.

Further, the resource converting module 242 converts IRQ(s) received from the graphics card 230 by the VMM 240 to interrupt number(s) for the GOS(s) 220$_1$ ... 220$_n$, and then sends the number(s) to the GOS(s) 220$_1$ ... 220$_n$. The GOS(s) 220$_1$ ... 220$_n$ processes the IRQ(s) from the graphics card 230 sent via the VMM 240 by means of the real graphics card drive(s) 222$_1$ ... 222$_n$.

The number of the resource converting table(s) corresponds to that of the GOS(s) 220$_1$ ... 220$_n$.

Also, the real graphics card drive 212 of the SOS 210 accesses the graphics card 230 directly, but neither has the graphics card accelerating property, nor amends values in registers of the physical graphics card 230.

In the communication module 241, the VMM 240 communicates with the SOS 210 and the GOS(s) 220$_1$ ... 220$_n$ by an interrupt or Event Channel. The SOS 210 communicates with the VMM 240 by a hypercall, and the GOS(s) 220$_1$ ... 220$_n$ communicates with the VMM 240 by a vmcall.

Because the resource allocating for the graphics card 230 by the GOS(s) 220$_1$ ... 220$_n$ may be different from the resource allocating for the graphics card 230 by the SOS 210, if the GOS(s) 220$_1$ ... 220$_n$ wants to access the graphics card 230 directly, a first task is to perform resource converting, which is performed by the resource converting module 242 as described in the following.

When the graphics card framebuffer accessing data from the GOS(s) 220$_1$ ... 220$_n$ reaches the VMM 240, the resource converting module 242 searches for the resource converting relations in the resource converting table(s), so as to convert an IO request address from the GOS(s) 220$_1$ ... 220$_n$ into a real 10 address of the graphics card 230, map a MMIO allocated to the graphics card 230 by the GOS(s) 220$_1$ ... 220$_n$ to a physical MMIO of the graphics card 230, and also convert an IRQ received from the graphics card 230 by the VMM 240 into an interrupt signal for the GOS(s) 220$_1$ ... 220$_n$ and send it to the GOS(s) 220$_1$ ... 220$_n$.

The resource converting table(s) is generated during the process of allocating resources for the graphics card 230, as described in the following:

The SOS 210 starts and scans a PCI bus to acquire the information on the graphics card 230 and allocate the resources (IRQs, IOs, and MMIOs) for the graphics card 230. The GOS(s) 220$_1$ ... 220$_n$ starts and scans a virtual PCI bus to find the real graphics card 230 provided by the DM 211, acquire the information on the graphics card 230, and allocate the resources (IRQs, IOs, and MMIOs) for the graphics card 230. The DM 211 is responsible to parse the allocating of the resources for the graphics card 230 by the GOS(s) 220$_1$ ... 220$_n$. The DM 211 generates the resource converting table(s) based on the resource allocating information for the graphics card 230 by the SOS 210 and the resource allocating information for the graphics card 230 by the GOS(s) 220$_1$ ... 220$_n$, and sends the table(s) to the VMM 240. The resource converting table(s) includes correspondences between IOs, IRQs and MMIOs allocated for the graphics card 230 by the SOS 210 and those allocated by the GOS (s) 220$_1$ ... 220$_n$.

Thus, with the assistances of the DM 211 and the VMM 240, the GOS(s) 220$_1$ ... 220$_n$ may access the graphics card hardware directly. Meanwhile, the SOS 210 accesses the graphics card 230 as in the normal single system.

Also, in order to ensure Direct Memory Access (DMA), the VMM 240 runs at the high end of a memory, while the GOS(s) 220$_1$ ... 220$_n$ runs at the low end of the memory. Thus, the physical memory addresses of the GOS(s) 220$_1$ ... 220$_n$ are consistent with the memory addresses of the machine, so the GOS(s) 220$_1$ ... 220$_n$ meets the requirements for DMA without modification. Also, the SOS 210 is a modified system, and thus meets the requirements for DMA. It is to be understood by those skilled in the art that it is possible for the GOS(s) 220$_1$ ... 220$_n$ not to run at the low end of the memory, especially when there are a plurality of GOSs 220$_1$ ... 220$_n$ running concurrently. It is possible to intercept DMA instructions by the VMM 240 and modify the memory addresses so as to achieve DMA, or to directly modify the processes of the GOS(s) 220$_1$ ... 220$_n$ with respect to the memory.

The GOS(s) 220$_1$ ... 220$_n$ may see the real graphics card 230, and the method of accessing the graphics card by the virtual machine system, wherein the graphics card 230 is accessed through the real graphics card drive 222$_1$ ... 222$_n$, comprises the following steps.

Step 11: The graphics card framebuffer accessing data from the GOS(s) 220$_1$ ... 220$_n$ is sent to the VMM 240 through the graphics card drive 222$_1$ ... 222$_n$.

Step 12: The VMM 240 performs 10 address converting on the graphics card framebuffer accessing data from the GOS(s) 220$_1$ ... 220$_n$ or maps the MMIO(s) to the physical MMIO(s) of the graphics card 230, based on the resource converting table(s) configured previously.

Step 13: The VMM 240 sends the processed data to the graphics card 230.

Step 14: The VMM 240 receives the IRQ(s) from the graphics card 230, and converts the IRQ(s) into the interrupt number(s) for the GOS(s) 220$_1$ ... 220$_n$ based on the resource converting table(s) and then sends the number(s) to the GOS(s) 220$_1$ ... 220$_n$.

The resource converting table(s) comprises the correspondences between the IO(s), MMIO(s) and IRQ(s) allocated for the graphics card 230 by the SOS 210 and those allocated by the GOS(s) 220$_1$ ... 220$_n$.

The process of configuring the resource converting table(s) is provided as follows.

The SOS 210 acquires the information on the graphics card 230, and allocates the resources for the graphics card 230.

The GOS(s) 220$_1$ ... 220$_n$ acquires the information on the graphics card 230 through the DM 211 of the SOS 210, and allocates the resources for the graphics card 230.

The DM 211 generates the resource converting table(s) based on the resource allocating information for the graphics card 230 by the SOS 210 and the resource allocating information for the graphics card 230 by the GOS(s) 220$_1$ ... 220$_n$, and then sends the table(s) to the VMM 240.

While achieving the direct accesses to the graphics card 230 by all the OSs of the virtual machines system, the virtual machine system according to the present invention may further comprise a framebuffer allocating module (not shown) for dividing the framebuffer resource of the graphics card 230 into a plurality of blocks, and allocating them to the corresponding GOS(s) 220$_1$ ... 220$_n$.

Also, the GOS(s) 220$_1$ ... 220$_n$ may start and scan the virtual PCI bus, to find the real graphics card 230 provided by the DM 211, and acquire the information on the graphics card 230. However, when allocating the resources for the graphics card 230, as to the framebuffer MMIO resources, the GOS(s) $220_1 \ldots 220_n$ can only obtain the framebuffer allocated previously by the framebuffer allocating module.

The framebuffer allocating module may be realized by use of the DM 211, and also may be realized by a separate module provided additionally in the VMM 240.

Through the above process, each GOS $220_1 \ldots 220_n$ of the virtual machine system according to the present invention may be allocated a different framebuffer. Therefore, each GOS $220_1 \ldots 220_n$ accesses the different framebuffer, effectively solving the problem of displaying confusion when a plurality of GOSs $220_1 \ldots 220_n$ share one graphics card 230.

Figure 3:
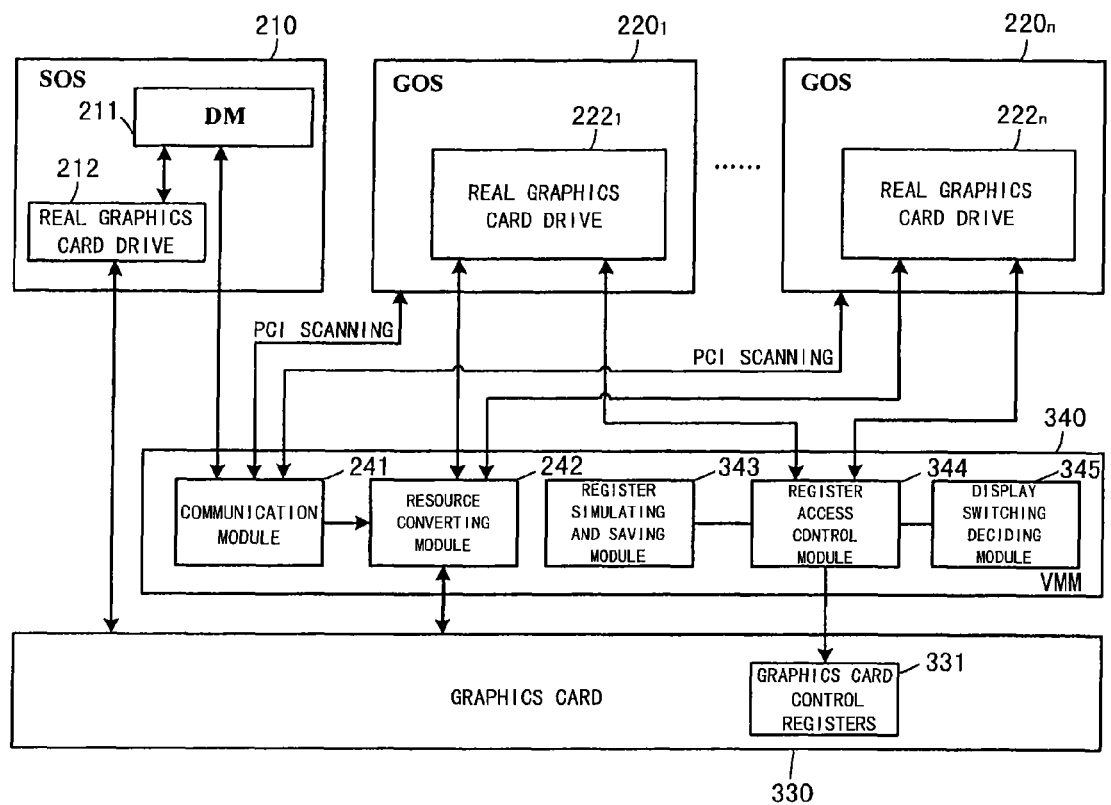
FIG. 3 is a schematic view showing a configuration of a virtual machine system according to the present invention.

Moreover, because there are several OSs, there must be a problem of switching display among the OSs, and also, there may be a problem that the respective OSs have different displaying modes. Therefore, on the basis of the virtual machine system shown in FIG. 2, a display switching decision module 345, a register access control module 344 and a register simulating and saving module 343 are added to the VMM 340 according the present invention, as shown in FIG. 3.

The display switching decision module 345 is provided for deciding an operating system having obtained the focus, in other words, the operating system in the foreground. The so-called operating system having obtained the focus, or in the foreground, is an operating system possessing input devices (such as keyboard and mouse).

The register access control module 344 is provided for, based on the decision result of the display switching decision module 345, sending the accesses to a graphics card control register 331 by the operating system having obtained the focus to the graphics card control register 331, while sending the accesses to the graphics card control register 331 by the other operating system(s) to the register simulating and saving module 343.

The register simulating and saving module 343, corresponding to the GOS(s) $220_1 \ldots 220_n$, simulates the changes in the graphics card control register 331 based on the accesses to the graphics card control register 331 by the GOS(s) $220_1 \ldots 220_n$ and the process flow of the graphics card control register 331, and saves the values of the graphics card control register 331.

Thus, it is possible to prevent the GOS(s) $220_1 \ldots 220_n$ in the background from dynamically amending a display start address register, which may result in display confusion.

Also, when the GOS(s) $220_1 \ldots 220_n$ is switched, the register access control module 344 restores the simulation values of the graphics card control register 331, corresponding to the GOS $220_1 \ldots 220_n$ switched to the foreground, saved in the register simulating and saving module 343 to the graphics card control register 331, before sending the access to the graphics card control register 331 by the operating system having obtained the focus to the graphics card control register 331. At the same time, the value of the display start address register of the graphics card 330 is amended to the start address of the framebuffer allocated to this GOS $220_1 \ldots 220_n$ switched to the foreground. Thus, the desktop of this GOS $220_1 \ldots 220_n$ switched to the foreground may be displayed on the display.

The register simulating and saving module 343 may simulate and save all the control registers of the graphics card 230. However, in practical use, it is sufficient to simulate the display mode register.

Figure 4:
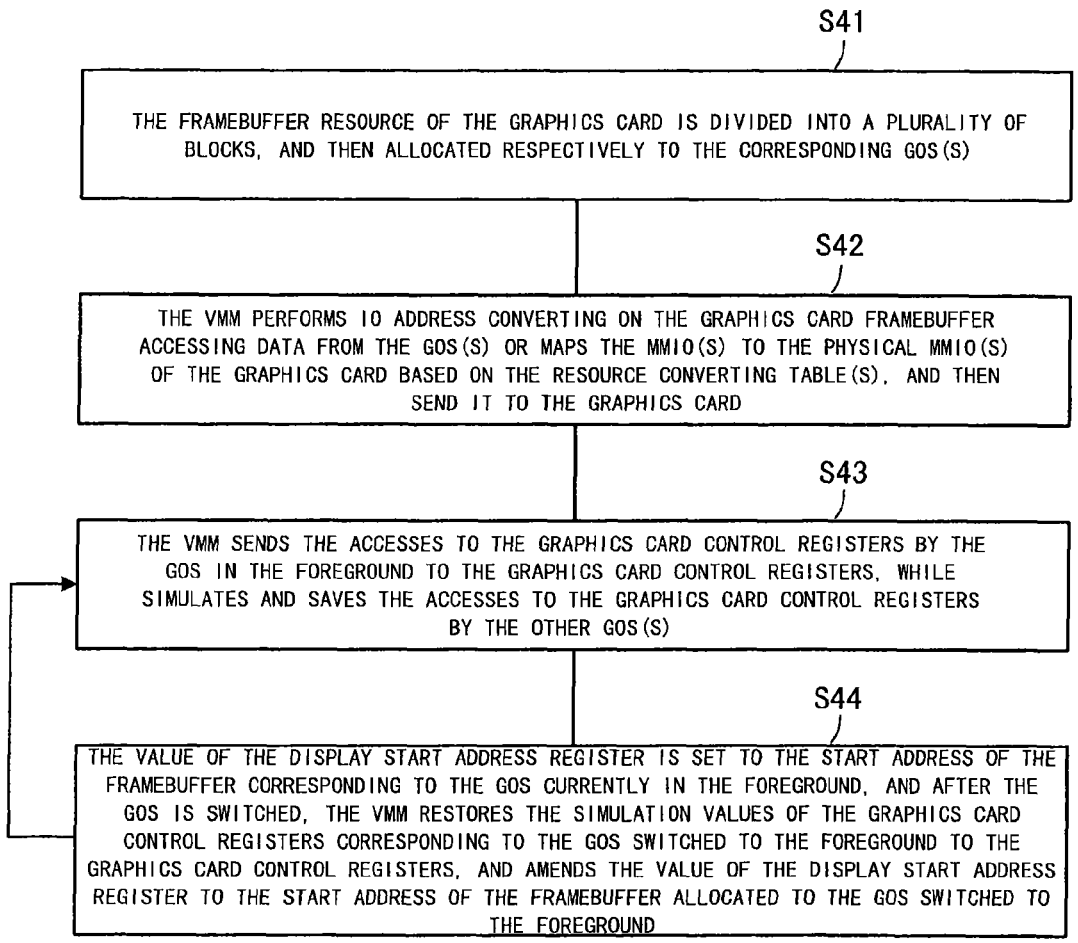
FIG. 4 is a schematic flowchart showing a method of accessing the graphics card by the virtual machine system according to the present invention.

The method of accessing the graphics card by the virtual machine system according to the present invention, as shown in FIG. 4, comprises the following steps:

step S41 allocating a framebuffer, in which the framebuffer resource of the graphics card is divided into a plurality of blocks, and then allocated respectively to the corresponding GOS(s);

step S42 processing the accesses to the framebuffer of the graphics card, in which the VMM performs 10 address converting on the graphics card framebuffer accessing data from the GOS(s) or mapping the MMIO(s) to the physical MMIO(s) of the graphics card based on the resource converting table(s), and then sending it to the graphics card;

step S43 processing the accesses to the graphics card control registers, in which the VMM sends the accesses to the graphics card control registers by the GOS in the foreground to the graphics card control registers, while simulating and saving the accesses to the graphics card control registers by the other GOS(s); and step S44 switching display, in which the value of the display start address register of the graphics card is set to the start address of the framebuffer corresponding to the GOS in the foreground, and when the GOS is switched, the VMM restores the simulation values of the graphics card control registers corresponding to the GOS switched to the foreground to the graphics card control registers, and amends the value of the display start address register of the graphics card to the start address of the framebuffer allocated to the GOS switched to the foreground, and then returns the step of processing the accesses to the graphics card control registers, wherein, the GOS(s) starts, and scans the virtual PCI bus, to find the real graphics card provided by the DM and acquire the information on the graphics card. However, when allocating the resources for the graphics card, as to the framebuffer MMIO resources, the GOS(s) can only obtain the framebuffer allocated previously by the framebuffer allocating module.

The step of processing the accesses to the framebuffer of the graphics card further comprises converting the IRQ(s) sent from the graphics card into the interrupt number(s) for the GOS(s) based on the resource converting table(s) and then sending the number(s) to the corresponding GOS(s).

Next, the respective steps are described in more detail.

The step of processing the accesses to the framebuffer of the graphics card may comprise:

step 41: sending the graphics card framebuffer accessing data from the GOS(s) to the VMM through the graphics card drive(s);

step 42: performing IO address converting on the graphics card framebuffer accessing data from the GOS(s) or mapping the MMIO(s) to the physical MMIO(s) of the graphics card, by the VMM, based on the previously configured resource converting table(s);

step 43: sending the processed data to the graphics card by the VMM; and step 44: receiving the IRQ(s) from the graphics card by the VMM, and converting the IRQ(s) into the interrupt number(s) for the GOS(s) based on the resource converting table(s) and then sending the number(s) to the GOS(s).

The step of processing the accesses to the graphics card control registers may comprise:

step 51: deciding the operating system in the foreground by the VMM;

step 52: intercepting the accesses to the graphics card control registers from all the GOSs;

step 53: setting the accesses to the graphics card control register from the GOS in the foreground to be valid, and sending them to the graphics card control register; and step 54: simulating and saving the accesses to the graphics card control register from the other GOS(s) in the manner of the real process flow of the graphics card control registers.

It is to be noted that the embodiments described above are provided for illustrating rather than limiting the present invention. It is to be understood by those skilled in the art that there may be various modifications or replacements to the embodiments without departing from the scope and the spirit of the present invention, and they shall fall into the scope defined by the appended claims.

What is claimed is:

1. A virtual machine system, comprising a Virtual Machine Monitor (VMM), a Service Operating System (SOS), and at least one Guest Operating System (GOS), wherein the VMM comprises a communication module and the SOS comprises a Device Module (DM), wherein the virtual machine system further comprises:

a resource converting module for performing Input/Output (IO) address converting on a graphics card framebuffer accessing data from the at least one GOS or mapping at least one Memory Mapped IO (MMIO) to at least one physical MMIO of a graphics card based on an at least one resource converting table and sending the processed data to the graphics card;

a framebuffer allocating module for dividing a framebuffer resource of the graphics card into a plurality of blocks and allocating them respectively to the corresponding at least one GOS;

a register access control module for setting a value of a display start address register of the graphics card to a start address of the framebuffer corresponding to the GOS currently in the foreground, and sending accesses to graphics card control registers by the operating system currently in the foreground to the graphics card control registers, while sending accesses to the graphics card control registers by at least one other operating system to a register simulating and saving module; and the register simulating and saving module for simulating changes in the graphics card control registers based on the accesses to the graphics card control registers by the at least one GOS and a process flow of the graphics card control registers, and saving the values of the graphics card control registers, wherein, the at least one resource converting table records correspondences between a resource allocation for the graphics card by the SOS and a resource allocation or resource allocations for the graphics card by the at least one GOS, and at least one framebuffer MMIO resource allocated to the graphics card by the GOS is the framebuffer allocated to the at least one GOS by the framebuffer allocating module.

2. The virtual machine system according to claim 1, wherein the resource converting module is further configured to convert at least one IRQ received from the graphics card into at least one interrupt number for the at least one GOS and then send the at least one number to the corresponding at least one GOS.

3. The virtual machine system according to claim 1, wherein the at least one resource converting table comprises the correspondences between IOs, the correspondences between interrupt requests (IRQs) and the correspondences between MMIOs after the SOS and the at least one GOS allocate the resources for the graphics card respectively.

4. The virtual machine system according to claim 1, characterized in that, the VMM runs at a high end of a memory, while the at least one GOS runs at a low end of the memory.

5. The virtual machine system according to claim 1, wherein the register access control module is also configured to, when a switching takes place, restore simulation values of the graphics card control registers corresponding to a first GOS switched to the foreground to the graphics card control registers, sending the accesses to the graphics card control registers by the first GOS to the graphics card control registers, and also amending the value of the display start address register of the graphics card to the start address of the framebuffer allocated to the first GOS.

6. A method of accessing a graphics card by a virtual machine system, comprising:

a step of allocating a framebuffer, in which a framebuffer resource of the graphics card is divided into a plurality of blocks, and then allocated to at least one corresponding Guest Operating System (GOS);

a step of processing accesses to the framebuffer of the graphics card, in which a Virtual Machine Monitor (VMM) performs Input/Output (IO) address converting on graphics card framebuffer accessing data from the at least one GOS or maps at least one Memory Mapped IO (MMIO) to at least one physical MMIO of the graphics card based on at least one resource converting table, and then sends it to the graphics card; and a step of processing accesses to graphics card control registers, in which the VMM sends the accesses to the graphics card control registers by a GOS in the foreground to the graphics card control registers, while simulating and saving the accesses to the graphics card control registers another at least one GOS based on a real process flow of the graphics card control registers, wherein, the at least one resource converting table records correspondences between a resource allocation for the graphics card by a Service Operating System (SOS) and at least one resource allocation for the graphics card by the at least one GOS, the at least one framebuffer MMIO resource allocated to the graphics card by the at least one GOS is the framebuffer allocated to the at least one GOS by the framebuffer allocating module.

7. The method according to claim 6, further comprising:

a step of switching display, in which a value of a display start address register of the graphics card is set to a start address of the framebuffer corresponding to the GOS currently in the foreground, and when a switching takes place, the simulation values of the graphics card control registers corresponding to a first GOS switched to the foreground are restored to the graphics card control registers, the accesses to the graphics card control registers by the first GOS are sent to the graphics card control registers, and also the value of the display start address register of the graphics card are amended to the start address of the framebuffer allocated to the first GOS.

8. The method according to claim 6, further comprising a step of converting at least one interrupt request (IRQ) received from the graphics card into at least one interrupt number for the at least one GOS and then sending the at least one interrupt number to the corresponding at least one GOS.

9. The method according to claim 6, wherein the at least one resource converting table comprises the correspondences between IOs, the correspondences between interrupt requests (IRQs) and the correspondences between MMIOs after the SOS and the at least one GOS allocate the resources for the graphics card, respectively.

* * * * *